United States Patent Office 3,660,455
Patented May 2, 1972

3,660,455
PREPARATION OF ORGANIC PERCHLORATES
David M. Hoffman, Chester, Pa., assignor to Sun Oil
Company, Philadelphia, Pa.
No Drawing. Filed Mar. 31, 1970, Ser. No. 24,390
Int. Cl. C07c 71/00
U.S. Cl. 260—453 R
20 Claims

ABSTRACT OF THE DISCLOSURE

Hydrocarbyl perchlorates are prepared by contacting certain kinds of feed reactants with perchloric acid in an emulsion comprising a strong sulfuric acid phase and an organic phase comprising an inert organic solvent. The feed reactants can be alkenes, cycloalkenes, alkanols, cycloalkanols, and certain aralkenes and aralkanols. The perchloric acid can be generated in situ in the mixture by reaction of a perchlorate metal salt with the sulfuric acid. The hydrocarbyl perchlorate products have utility as detonatable sensitizers for explosives and as alkylating agents.

CROSS REFERENCE TO RELATED APPLICATION

My copending application, Ser. No. 66,051, filed Aug. 21, 1970, and entitled "Preparation of Diperchlorates From Dienes and Diols" describes and claims the preparation of organic perchlorates from non-conjugated dienes and diols by a procedure which is substantially the same as that used in the present process, with the amount of perchloric acid being sufficient to provide at least one mole of perchloric acid for each olefinic bond or hydroxy group in the feed reactant. In that case, however, diperchlorates constitute at least most of the product.

BACKGROUND OF THE INVENTION

This invention relates to the preparation of organic perchlorates from certain types of hydrocarbons having an olefinic bond or from certain types of alcohols. The products are hydrocarbyl esters of perchloric acid. They have explosive characteristics and must be handled with caution.

In the prior art several methods have been shown for the preparation of alkyl or aralkyl perchlorates, and these have been described in a review article entitled "Perchloric Acid and Some Organic Perchlorates," by Burton et al., Analyst, 80 pps. 4–5 (1955). One involves the metathetical reaction of an alkyl halide with silver perchlorate according to the equation:

$$RX + AgClO_4 \rightarrow RClO_4 + AgX$$

Another involves the distillation of barium alkyl sulfate with barium perchlorate to effect the following reaction:

$$Ba(RSO_4)_2 + Ba(ClO_4)_2 \rightarrow 2RClO_4 + 2BaSO_4$$

A third known procedure comprises the reaction of diazomethane with perchloric acid in the following manner:

$$CH_2N_2 + HClO_4 \rightarrow CH_3ClO_4 + N_2$$

These procedures are costly and may also be hazardous due to the explosive tendencies of the perchlorate products, and none of them provides a desrable way for the commercial preparation of hydrocarbyl perchlorates.

Several references cited in the aforesaid review article show that hydrocarbyl perchlorates can be used as alkylating agents to alkylate such materials as benzene, toluene, phenol and anisole.

DESCRIPTION OF THE INVENTION

The present invention provides a facile way of producing hydrocarbyl perchlorates from alkenes, cycloalkenes, aralkenes, alkanols, cycloalkanols and aralkanols of the classes hereinafter defined. The reaction is carried out in an emulsion containing an inert solvent and the perchlorate products are preferably recovered as solutions in the solvent rather than as isolated compounds. The diluent effect of the inert solvent reduces the explosive tendencies of the perchlorates and makes them more readily handleable.

The process according to the invention comprises contacting a feed reactant, as hereinafter specified, with perchloric acid in an emulsion comprising a sulfuric acid phase having a strength in the range of 80–101% by weight $H_2SO_4$, more preferably 90–100% $H_2SO_4$, and an organic phase comprising an inert organic solvent. The contacting of these materials is carried out at a reaction temperature above the freezing point of the acid phase but below 75° C. and usually below 35° C. In many cases the reaction occurs almost instantaneously to form the hydrocarbyl perchlorate product which is soluble in the solvent phase. Contacting of the phases preferably is stopped and the phases are separated as soon as the reaction has occurred, since the perchlorate products tend to be unstable in the presence of the acid phase.

As a specific illustration of the process utilizing cyclopentene as the feed reactant, an emulsion comprising 15 volumes of n-pentane as inert solvent, 30 volumes of sulfuric acid of 96% strength and 3 volumes of 70% (by weight) aqueous perchloric acid is stirred at $-5°$ C. and one volume of cyclopentene is added to the mixture. The reaction is essentially complete as soon as the cyclopentene has been thoroughly mixed into the emulsion. The reaction that occurs is illustrated in Eyuation I.

I

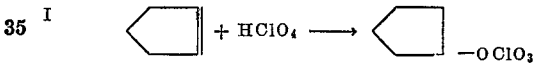

The cyclopentyl perchlorate product typically is obtained in a yield of 90% or more of the theoretical yield.

As another specific illustration, a mixture of 15 ml. of cyclopentane as inert solvent, 35 ml. of 96% $H_2SO_4$ and 3.5 g. of lithium perchlorate is stirred at about $-10°$ C., and to the agitating mixture 1.0 ml. of a liquid mixture of 1-butene and 2-butene is added. The lithium perchlorate reacts with the sulfuric acid to form perchloric acid in situ and the latter immediately reacts with the butenes as shown in Equation II.

II

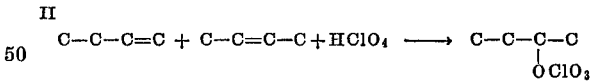

As shown in the equation, both olefin isomers convert to the same product, viz 2-butyl perchlorate. This formation of non-primary perchlorates is typical of the invention, since in at least most cases primary perchlorates are not formed.

As a third specific illustration of the process, when cyclohexanol is substituted for cyclopentene in the first illustration above and the process otherwise is carried out under the same conditions, the reaction shown in Equation III occurs:

III

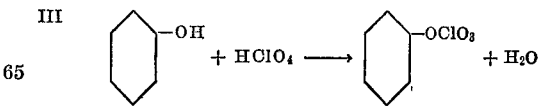

About the same yield of perchlorate product is obtained as in the case of cyclopentene, i.e. 90% or higher.

The sulfuric acid in the reaction mixture should have a strength in the range of 80–101% $H_2SO_4$ by weight and preferably has a strength in the range of 90–100%

$H_2SO_4$. The term "strength" as herein used is calculated taking into account only the total water and the total $H_2SO_4$ on a weight basis in the reaction mixture. In the case of fuming sulfuric acid corresponding to strengths in the range of 100–101%, the strength corresponds to the total $H_2SO_4$ equivalent.

The perchloric acid for the reaction can be added to the mixture as such, i.e. as 70% aqueous perchloric acid which is available commercially, or it can be generated in situ by adding a metal perchlorate salt, such as an alkali metal or alkaline earth metal perchlorate, which reacts with the sulfuric acid to form perchloric acid. When a salt is used for this purpose, lithium perchlorate is particularly suitable since it generally reacts with the sulfuric acid more rapidly than other metal perchlorate salts.

The solvents used to form the organic phase of the reaction mixture should be capable of dissolving the perchlorate products formed, be essentially inert in the reaction mixture and of course be liquid at the reaction temperature selected. The preferred solvents are saturated hydrocarbons including paraffins and naphthenes. The following are illustrative examples: n-butane; isobutane; n-pentane; isopentane; cyclopentane; n-hexane; isohexanes; methylcyclopentane; heptanes; methylcyclohexane; octanes; dimethylcyclohexane; decanes; tetrahydronaphthalene; methyltetrahydronaphthalenes and the like.

Numerous halohydrocarbons can also be used as the inert solvent. These include halobenzenes having 1–2 halogen atoms, halomethanes and haloethanes having 1–5 halogen atoms in which the halogen is chlorine and/or fluorine. Illustrative examples are: clorobenzene; ortho- and meta-dichlorobenzenes or difluorobenzenes; methylene chloride; methyl chloroform; 1,1,2-trichloroethane; 1,1,2,2-tetrachloroethane; trifluoroethanes; chlorodifluoroethanes; tetrafluoroethanes and pentachloroethane.

The types of compounds that can be used as feed reactants for the process are hydrocarbons containing one olefinic bond and alcohols selected from the following classes:

(a) $C_3$–$C_{30}$ alkenes,
(b) $C_4$–$C_{30}$ cycloalkenes,
(c) $C_9$–$C_{30}$ aryl-substituted alkenes and cycloalkenes in which the olefinic bond is located at a position other than alpha to the aromatic nucleus,
(d) $C_3$–$C_9$ saturated primary alcohols,
(e) $C_3$–$C_{30}$ saturated non-primary alcohols, and
(f) $C_{10}$–$C_{30}$ aryl-substituted non-primary alkanols and cycloalkanols in which the hydroxy group is located at a position other than alpha or beta to the aromatic nucleus.

Examples of class (a) reactants are as follows: propene; n-pentenes; isopentenes; n- and isohexenes; octenes; decenes; hexadecenes; eicosenes; tricontenes and the like. In these feed compounds the olefinic bond can be terminal or located at any possible internal position. Within this class the compounds which give the highest yields of perchlorate products are the unbranched alkenes, and these are preferred starting materials. However, branched alkenes having one or more branches, including gem-substituted alkenes, are operative, although the yields of perchlorates obtained from them usually are not as high as when straight chain alkenes are employed. Also alkenes having not more than 20 carbon atoms per molecule generally are preferred.

Cycloalkene reactants of class (b) are illustrated by the following compounds: cyclobutene; cyclopentene; methylcyclopentenes; cyclohexene; dimethylcyclopentenes; methyl- or dimethylcyclohexenes; cyclooctene; cyclododecene; 1-cyclopentyl-2-propene; vinylcyclohexane; 6-cyclohexylhexene-1 or -2 or -3; dimethylcycloheptyldecenes; norbornenes; vinyladamantanes; allyladamantanes; dimethyladamantylnonenes; octalins dodecahydroanthracenes; tetradecahydropyrenes; decahydronaphthyloctenes; cyclododecyloctadecenes and analogous monoolefinic hydrocarbons. Among the compounds of this class, the cycloalkenes having a single ring with the double bond therein and no substituent tend to give the highest yields of perchlorates. It is generally preferred that the cycloalnene used have not more than 20 carbon atoms per molecule.

Examples of the aryl-substituted alkenes and cycloalkenes of class (c) are: 3- or 4-phenyl-1-butene; 1-phenyl-2-butene; 5,5-diphenyl-1- or -2-hexene; 3-phenyl-1-cyclohexene; 1-($\beta$-naphthyl)-5-hexene; 4-xylyl-4-methyl-1- or -2-pentene; cumyl-1-hexadecenes other than those isomers with the cumyl radical at the 1- or 2- position; 8-($\alpha$-naphthyl)-1- or 2- or 3-octene; 1,4,4a,5,12,12a-hexahydronaphthacene and anthryl substituted hexadecenes with the anthryl radical positioned on a carbon atom other than those sharing the olefinic bond. In other words the compounds of this class should not have the olefinic bond in conjugation with an aryl ring, as this tends to lead to polymerization rather than perchloration. Compounds of this class having not more than 20 carbon atoms per molecule generally are preferred.

The class (d) compounds are exemplified by the following alkanols and cycloalkanols: 1-propanol; 1-butanol; isobutanol; 1-pentanol; 2- or 3-methylbutanol-1; neopentanol; any of the $C_6$–$C_9$ alkanols in which the hydroxy group is attached to a primary carbon atom; cyclobutylmethanol; 2-cyclopentylethanol-1; 3-cyclohexylpropanol-1 and the like. Saturated primary alcohols having ten or more carbon atoms per molecule will not produce perchlorates in substantial yields in the present process and are not included as feed materials.

The feed reactants of class (e) can be either secondary or tertiary alcohols including both alkanols and cycloalkanols. The following compounds illustrate this class: isopropanol; 2-butanol; t-butanol; 2- or 3-pentanol; 2-methyl- or 3-methylbutanol-2; any of the secondary tertiary octyl, dodecyl, octadecyl, eicsosyl or triacontyl alcohols with either straight or branched carbon chains; cyclobutanol; cyclopentanol; cyclohexanol; dimethylcyclohexanols; cyclooctanol; cyclododecanol; octadecyclohexanols; adamantyloctanols; dicyclohexyloctadecanols and analogous alcohols. The compounds of this class which give the highest yields are unbranched secondary alcohols and these are preferred reactants. Again it is preferred that feed reactants of this class have not more than 20 carbon atoms per molecule.

The class (f) compounds can resemble the alkanols and cyclolkanols described for class (e) but also have one or more aryl groups in the molecule, provided that the hydroxy substituent is located on the saturated moiety at a position other than alpha or beta to the aromatic nucleus. A few examples are: 1-phenyl-3-butanol; 1-($\beta$-naphthyl)-5-methyl-5-hexanol and 1-(p-diphenyl)-4-octadecanol. Aryl-substituted alcohols of this class also preferably have not more than 20 carbon atoms per molecule.

The preferred procedure for carrying out the reaction comprises first establishing an emulsion of (1) an acid phase composed of sulfuric acid of strength as previously specified, preferably 90–100% $H_2SO_4$, and perchloric acid, and (2) an organic phase composed of the inert solvent. The temperature of the emulsion is adjusted to the desired level, and while the emulsion is being agitated the olefin or alcohol reactant is added. The amount of perchloric acid provided in the mixture is at least that stoichiometrically required for producing the desired hydrocarbyl perchlorate, and usually an excess amount is used such that the molar ratio of perchloric acid to reactant is in the range of 1:1 to 5:1. The weight ratio of sulfuric acid to perchloric acid in the initial mixture is not critical and can vary widely, typically being in the range of 5:1 to 20:1. The feed reactant, especially in the case of olefins, preferably is added slowly while agitating the mixture thoroughly in order to prevent side reactions that can occur if perchloric acid is not available at the locus where the reaction is taking place. After addition of the olefin or alcohol reactant, stirring of the mixture should be continued only until an optimum yield of hydrocarbyl perchlorate has been obtained. Since the perchlorate products tend to be unstable in the presence of the sulfuric acid, it is best to separate the phases as soon as the optimum yield has been reached. The time required for this depends largely upon the particular feed reactants charged, the strength of the sulfuric acid and the reaction temperature employed.

The process can also be carried out by first forming an emulsion of the sulfuric acid, inert organic solvent and the olefin or alcohol reactant and thereafter adding perchloric acid or a metal perchlorate salt to form perchloric acid in situ. However, this procedure is less preferable since the reactant may undergo other reactions (e.g. polymerization) yielding undesired products before the perchloric acid is added. In cases when this procedure is employed, a low reaction temperature should be used and the perchloric acid or perchlorate salt should be added to the mixture immediately after the olefin or alcohol has been added to minimize these undesired reactions.

The temperature for carrying out the process can range from just above the freezing point of the acid phase up to 75° C. but temperatures below 35° C. generally are preferred. Elevated temperatures may increase the danger due to the explosive character of hydrocarbyl perchlorates, as well as promote rapid decomposition of these products in contact with the acid phase. The optimum temperature level varies depending upon the particular feed reactant used. Alkenes and cycloalkenes having less than ten carbon atoms per molecule generally give substantially better product yields at temperatures below 10° C., whereas higher molecular weight alkenes and cycloalkenes usually give about the same yields at these low temperatures as at room temperature. Saturated non-primary alcohols, except for isopropanol, tend to perform in more or less the same fashion as the alkenes and cycloalkenes having corresponding numbers of carbon atoms and skeletal structures.

Primary alcohols of the $C_3$–$C_9$ range tend to be unretive at low temperatures but sufficiently reactive at room temperature to give substantial yields of perchlorates. On the other hand, primary alcohols having more than ten carbon atoms do not appear suitable for conversion to hydrocarbyl perchlorates under any of the conditions of the present process. While they may become reactive if the temperature is raised sufficiently, any resulting perchlorate products decompose too rapidly to permit them to accumulate in substantial amounts in the reaction mixture.

The yield of perchlorate products from the aryl-substituted olefinic compounds of class (c) depends upon how close the olefinic double bond is to the aryl group. If the double bond is close to the conjugated position, it tends to isomerize into conjugation and this leads to undesirable side reactions such as polymerization. An increase in reaction temperature promotes such double bond isomerization and thus can have an adverse effect upon the yield of desired perchlorate products. Consequently, the closer the olefinic double bond is initially to the conjugated position, the more will be the benefit derived from using a low reaction temperature. When the olefinic bond initially is remote from the conjugated position, then the reaction proceeds in much the same manner as for the higher alkenes and cycloalkenes, and the temperature does not have any large influence on the desired perchlorate yield.

The behavior of isopropanol at low reaction temperatures is anomalous in comparison with the behavior of other non-primary alcohols having less than 10 carbon atoms. The latter, including both secondary and tertiary alcohols, tend to give best yields at low reaction temperatures such as —15° C. to 0° C. and substantially poorer yields at room temperature. These non-primary alcohols also tend to resemble the corresponding alkenes and cycloalkenes in regard to the temperature level at which optimum yield of perchlorate product is obtained. On the other hand, isopropanol, unlike propene, gives poor yields at low temperatures, e.g. at —5° C., but good yields at elevated temperatures. Consequently, when isopropanol is used as the feed reactant, a temperature in the range of 10–35° C. or even higher is desirable, as compared to a temperature of say —15° C. to 0° C. when propene is the reactant.

A feed reactant which does not contain any tertiary carbon atom generally gives higher yields of perchlorate products than those containing one or more tertiary carbons. Consequently, reactants such as unbranched alkenes, unbranched secondary alkanols, unsubstituted cycloalkenes and cycloalkanols are preferred starting materials. On the other hand, a feed reactant containing a tertiary carbon atom which is sufficiently spaced from the olefinic bond or hydroxyl group also will give good yields of perchlorate products and the yields tend to improve in proportion to the degree of spacing. For example, a branched alkene in which the olefinic bond and the nearest branch are relatively remote from each other (e.g. 8-methylnonene-2) will perform in the reaction in about the same fashion and give about the same perchlorate yield as the straight chain alkene having the same number of carbon atoms (2-decene).

The hydrocarbyl perchlorate products of the process are present in the solvent phase after the reaction has taken place and are recovered in diluted form merely by separating the phases. If desired, the solvent phase can be washed with water to remove any residual acid. Usually it is desirable not to remove the solvent, or alternatively to remove only part of it for recycling, since presence of the solvent negates or reduces the explosive tendencies of the perchlorate products. In cases where it is desired to remove all of the solvent, this should be done under reduced pressure in order to avoid handling of the perchlorates at elevated temperture. As an alternative procedure, a low boiling material such as isobutane or n-butane can be used as the solvent, in which case the perchloration reaction can be carried out under pressure to keep the solvent liquid and following the reaction evaporation of it from the perchlorate product can be done at atmospheric pressure. The hydrocarbyl perchlorates, in the absence of any solvent, vary in character from oily liquids to solid materials depending on the size and structure of the hydrocarbyl moiety.

The hydrocarbyl perchlorates in solvent solution, as recovered from the present process, can be utilized in that form to provide detonatable sensitizers for conventional explosives, such as compositions containing ammonium nitrate, sodium nitrate, dinitrotoluene and/or trinitrotoluene. The use of sensitizers for explosives is known, as can be seen by reference to Ecyclopedia of Chemical Technology, Kirk-Othmer, 2nd. Ed., vol 8 pps. 643–644. After addition of the perchlorate solution to the explosive material, the solvent can, if desired, be evaporated under reduced pressure, leaving the perchlorate sensitized well dispersed throughout the mixture. The perchlorate products, dissolved in the inert solvent, can also be utilized for alkylating aromatic compounds in the manner shown in references listed in the aforesaid review article. .

In the following discussion numerous specific examples are given which illustrate the invention. In these examples the yield of hydrocarbyl perchlorate products was determined by analyzing samples of the solvent layer by a colorimetric procedure and calculating the yield (based on theory) from the total amount of perchlorate indicated. This procedure is a modification of that described by Bodenheimer and Weiler, Bull. Research Council Israel, 4, 316 (1954): C.A., 49, 13022–23 (1955); which compares (1) the color developed by reacting a standard aqueous solution of cupric nitrate and pyridine with a test sample containing the perchlorate material with (2) the colors of known reference standards. The modification involves utilizing in place of the standard aqueous solution an ethanolic solution of cupric nitrate and pyridine containing sufficient ethanol to solubilize the sample of solvent layer to be tested. Analyses by the modified method were proved to be accurate by comparison with known perchlorate solutions in ethanol and also by comparsion with NMR analyses.

EXAMPLES 1–2

Two runs were made in which 1-pentene was converted to pentyl perchlorates utilizing in one case aqueous perchloric acid (70%) and in the other case lithium perchlorate. In Run 1 an emulsion was prepared by mixing 30 ml. of 96% sulfuric acid, 2.0 ml. of aqueous perchloric acid and 15 ml. of hexane. The mixture was cooled to about —10° C. and 1.0 ml. of 1-pentene was added over a time of 5 minutes. The phases were then separated, a sample of the solvent phase was analyzed for perchlorate content by the modified colorimetric method and the yield based on theory was calculated. In Run 2 3.5 g. of $LiClO_4$ were dissolved in 35 ml. of 96% sulfuric acid and the mixture was emulsified with 15 ml. of hexane by stirring. The temperature was held at about —10° C. and 1.0 ml. of 1-pentene was slowly added. After 5 minutes the phases were separated and a sample of the solvent phase likewise was analyzed. Yields of perchlorate products were as follows:

| | Percent |
|---|---|
| Run 1 | 96 |
| Run 2 | 98 |

These runs show that essentially equivalent results are obtained by using perchloric acid as such or by using a perchlorate salt to generate perchloric acid in situ.

EXAMPLES 3–4

Comparative runs (Runs 3, 4A and 4B) were made to show the effect of order of addition of the reactant materials. Run 3 was carried out in the preferred manner by stirring an emulsion of 30 ml. of 96% sulfuric acid, 4 ml. of 70% perchloric acid and 15 ml. of hexane at about —10° C. and then adding thereto 1.0 ml. of 2-hexane over one minute time. The phases were then immediately separated and a sample of the hydrocarbon phase was analyzed by the colorimetric procedure. Run 4A was carried out by adding, during a 15 second period, 1.0 ml. of 2-hexene to a stirred emulsion of 30 ml. of 96% sulfuric acid and 15 ml. of hexane maintained at —10° C., stirring for one minute, and then adding and mixing into the emulsion 4 ml. of 70% perchloric acid. A sample of the solvent phase was then immediately taken for analysis. Run 4B was carried out in exactly the same way as Run 4A except that the emulsion was stirred for a time of 6 minutes between the addition of the 2-hexene and addition of the perchloric acid. The following shows the yields of perchlorate for the different samples:

| | Percent |
|---|---|
| Run 3 ($HClO_4$ first) | 100 |
| Run 4A (olefin first; 1 min. wait) | 100 |
| Run 4H (olefin first; 6 min. wait) | 80 |

These results show that for 2-hexene under the conditions employed substantially quantitative yields of hydrocarbyl perchlorates can be obtained by using either order of addition of the reactants, provided that the olefin is not permitted to contact the acid phase for a substantial time before the perchloric acid is added.

EXAMPLES 5–6

These runs show the perchloration of 1-hexene employing acid strengths of 96% and 90%, respectively. In each run an emulsion of 30 ml. of the sulfuric acid, 3.0 ml. of 70% perchloric acid and 15 ml. of hexane was stirred at about —10° C., 1.0 ml. of 1-hexene was added, and as soon as the olefin had become dispersed the phases were separated. Yields of perchlorate products were as follows:

| | Percent |
|---|---|
| Run 5 (96% $H_2SO_4$) | 100 |
| Run 6 (90% $H_2SO_4$) | 70 |

These results show that at the low reaction temperature here used 1-hexene reacts more rapidly in the presence of 96% $H_2SO_4$ than when 90% $H_2SO_4$ is employed.

EXAMPLES 7–8

These runs were made in the same manner and with the same reactants as Runs 5 and 6, except that the temperature was 0° C. and weaker acid strengths were used, viz. 85% $H_2SO_4$ in Run 7 and 80% $H_2SO_4$ in Run 8. In each case a sample of the solvent phase was taken shortly after addition of the olefin and thereafter the reaction was continued with two additional samples being taken. Results based on colorimetric analyses are shown in Table I.

TABLE I.—PERCHLORATION OF 1-HEXENE

| | Time, mins. | Perchlorate yield, percent |
|---|---|---|
| Run: | | |
| 7 (85% $H_2SO_4$) | 0 | <5 |
| | 20 | 80 |
| | 35 | 60 |
| 8 (80% $H_2SO_4$) | 0 | <5 |
| | 15 | <5 |
| | 30 | ca. 5 |

The results for these runs show that the reaction rate depends upon acid strength, and that when the acid strength is reduced to 80% the reaction rate becomes too slow at the reaction temperature here used. The results for Run 7 also show that an optimum yield of the perchlorate is reached and that further contacting of the phases thereafter reduces the yield.

EXAMPLES 9–11

Three runs were made in which 1-dodecene was perchlorated at room temperature utilizing acid strengths of 85%, 90% and 96% $H_2SO_4$, respectively. The proportions of materials employed were approximately the same as in Runs 5–8 and the same order of addition was used, the main difference in procedure being that temperatures were maintained at about 25° C. In Run 9 and Run 10 samples of the solvent phase were taken at different times, while in Run 11 (96% $H_2SO_4$) the reaction was essentially complete as soon as the 1-dodecene had been added and only one sample was taken. Dodecyl perchlorate yields as determined by colorimetric analysis were as given in Table II.

TABLE II.—PERCHLORATION OF 1-DODECENE

| Time, min. | Run 9 (85% $H_2SO_4$) | Run 10 (90% $H_2SO_4$) | Run 11 (96% $H_2SO_4$) |
|---|---|---|---|
| 0, percent | 0 | 35 | 92 |
| 15, percent | 0 | 60 | |
| 60, percent | >3 | 80 | |
| 100, percent | | 90 | |

These results show that 1-dodecene can readily be perchlorated at room temperature provided the strength of the sulfuric acid used is sufficient.

EXAMPLES 12–14

Three runs were made to determine the relative stabilities of different alkyl perchlorates ranging from $C_3$ to $C_{12}$. Specifically the olefin reactants used were propene (Run 12), 1-pentene (Run 13) and 1-dodecane (Run 14). Each run was carried out at —10° C. in substantially the same manner as Runs 5–6, except that in Run 12 the propene was bubbled as a gas into the emulsion over a time of about 3 minutes. In each run, after the olefin had been added the emulsion was warmed quickly to about room temperature, samples of the solvent layer were taken at various times and stirring of the mixture was continued between times of sampling. The perchlorate products from each of these feed reactants are essentially all secondary alkyl perchlorates, as can be ascertained from NMR spectra. Analysis of the various samples resulted in total perchlorate yields as given in Table III.

TABLE III.—PERCHLORATION OF PROPENE, 1-PENTENE AND 1-DODECENE

| Time at room temperature, min. | Run 12 (propene) | Run 13 (1-pentene) | Run 14 (1-dodecene) |
|---|---|---|---|
| 0, percent | 96 | 100 | 94 |
| 5, percent | 82 | 63 | 100 |
| 10, percent | | 34 | |
| 15, percent | 74 | 23 | 100 |
| 20, percent | | 17 | |
| 30, percent | 63 | | 100 |

These results show that the stabilities of the perchlorates in contact with the acid phase depends upon what the hydrocarbyl moieties are. The dodecyl perchlorates are shown to be quite stable at room temperature, whereas the pentyl perchlorates rapidly decomposed upon continued contacting with the sulfuric acid phase. In contrast, the results for Run 12 show that isopropyl perchlorate is considerably more stable than the $C_5$ perchlorate of Run 13.

EXAMPLES 15–17

Three runs were made in which isopropanol was reacted at temperatures of about —10° C. (Run 15) and 25° C. (Runs 16 and 17), using in each case an emulsion of 30 ml. of 96% sulfuric acid, 4.0 ml. of 70% perchloric acid and 15 ml. of hexane. Runs 16 and 17 were duplicates to determine repeatability. In each run 1.0 ml. of 2-propanol was added to the emulsion while stirring; and as soon as thorough mixing had occurred, stirring was stopped and the phases were separated. Samples of the organic phase were tested by the colorimetric procedure, and yields of propyl perchlorate were calculated to be as follows:

| | Percent |
|---|---|
| Run 15 (—10° C.) | 6 |
| Run 16 (25° C.) | 65 |
| Run 17 (25° C.) | 75 |

These results show that isopropanol, unlike other secondary alcohols of the $C_3$–$C_{10}$ range, gives considerably better yields at room temperature than at low temperature when the acid strength is 96% $H_2SO_4$. NMR spectra of the product from these runs shows that it is substantially all isopropyl perchlorate.

EXAMPLE 18

An emulsion of 30 ml. of 96% sulfuric acid, 4.0 ml. of 70% perchloric acid and 15 ml. of hexane was stirred at about 25° C. and 1.0 ml. of 1-propanol was added. Stirring was continued and samples of the solvent phase were taken at various times as shown in the following tabulation. Yields of perchlorate product based on colorimetric analyses of these samples were as follows:

| Hour: | Percent |
|---|---|
| 0.25 | 10 |
| 0.5 | 21 |
| 1.0 | 28 |
| 1.5 | 42 |

A comparison of these results with Runs 16 and 17 shows that the primary propyl alcohol is substantially less reactive than isopropanol and requires a considerably longer time to reach an optimum yield of perchlorate product. While this product derived from 1-propanol is hydrocarbyl perchlorate, its exact structure has not thus far been ascertained.

EXAMPLES 19–22

Four runs were made in two of which 1-phenyl-2-butene was the feed reactant and in the other two of which the feed was 4-phenyl-1-butene. For each of these aryl-substituted alkenes runs were made at two different temperature levels, viz —10° C. and 25° C. The procedures used and the proportions of reactions were the same as described for Runs 15–17. Samples were taken for analysis as soon as the feed reactant had been mixed into the emulsion. From results the calculated yield of phenylbutyl perchlorates were as shown in Table IV:

TABLE IV.—PERCHLORATION OF PHENYLBUTENES

| Feed reactant | Temperature, ° C. | Perchlorate yield, percent |
|---|---|---|
| Run: | | |
| 19... 1-phenyl-2-butene... | —10 | 40 |
| 20......do............... | 25 | 6 |
| 21... 4-phenyl-1-butene... | —10 | 85 |
| 22......do............... | 25 | 35 |

Runs 19–22 show that these $C_{10}$ aryl-substituted alkenes give better yields at the low temperature than at room temperature when 96% $H_2SO_4$ is used. The data also show that better yields are obtained when the olefinic bond is further removed from the aryl group. This indicates that when the olefinic bond originally is close to the conjugated position, isomerization into conjugation may occur as a result of which undesirable side reactions can take place.

EXAMPLES 23–29

Seven runs were made in which chlorobenzene was used as the solvent and various hexenes or hexanols, as shown in Table V, were employed as feed reactants. The proportions of solvent, sulfuric acid (96%) and perchloric acid (70%) were approximately the same as used in Runs 15–17, and the temperature in each run was about —5° C. In Runs 23–27 the preferred procedure of adding the feed reactant to an emulsion containing the perchloric acid was employed, while in Runs 28–29 the feed reactant was added first and the perchloric acid last. In all runs the acid phase and solvent phase were separated from each other as soon as all of the feed reactant had been mixed into the emulsion. The reaction product in each run was a mixture of 2-hexyl perchlorate and 3-hexyl perchlorate only, with the total perchlorate yield being about stoichiometric. The relative distribution of these two isomers was determined in the product for each run by NMR and the results in Table V were obtained.

TABLE V.—ISOMER DISTRIBUTION OF $C_6$ PERCHLORIDES

| Feed reactant | Isomer distribution, percent | |
|---|---|---|
| | 2-isomer | 3-isomer |
| Run: | | |
| 23... 1-hexene...... | 80 | 20 |
| 24... 2-hexene...... | 45 | 55 |
| 25... 3-hexene...... | 20 | 80 |
| 26... 2-hexanol..... | 57 | 43 |
| 27... 3-hexanol..... | 57 | 43 |
| 28*.. 1-hexene...... | 50 | 50 |
| 29*.. 3-hexene...... | 50 | 50 |

*In these runs perchloric acid was added after the olefin had been added to the $H_2SO_4$-chlorobenzene emulsion.

The results in Table V show that both the 2- and 3- isomers of hexyl perchlorate are obtained as the perchlorate products regardless of which particular $C_6$ feed reactant was used. The relative proportions of these isomers, however, changed somewhat depending upon the specific feed material and also depending upon the order of addition of the reactants to the mixture.

In addition to the foregoing, numerous other specific runs were made with various olefins and alcohols, which runs need not be described in detail. The yields for these runs, calculated from the colorimetric analysis results, together with those for the runs previously described are presented in Tables VI and VII. In a few runs the calculated yields are slightly above the theoretical maximum and are taken to indicate approximately stoichiometric yields. Table VI is for olefinic hydrocarbon feeds while Table VII is for alcohols, with each feed type being arranged in the general order of increasing molecular weight. The procedure of adding the olefin or alcohol feed to the reaction mixture last and immediately sampling the organic layer after the feed had been thoroughly dispersed was used in all cases except as otherwise noted in Table VII.

TABLE VI.—PERCHLORATION OF OLEFINIC HYDROCARBONS

| Feed reactant | Perchlorate yield, percent on theory at— | |
|---|---|---|
| | −10° C. | 25° C. |
| Propene | 96 | |
| 2-methyl-1-butene | 27 | |
| 3-methyl-1-butene | 30 | |
| 2-pentene | 92 | 6 |
| 1-pentene | 98 | |
| 1-hexene | 99 | 9 |
| 2-hexene | 95 | 10 |
| 4-methyl-2-pentene | 20 | 6 |
| 2,3-dimethyl-1-butene | 20 | 5 |
| Cyclohexene | 89 | 14 |
| 1-heptene | 98 | 30 |
| 5-methyl-1-hexene | 78 | |
| 4-methyl-1-hexene | 55 | |
| 2-heptene | 105 | 27 |
| 3-heptene | 84 | 27 |
| 4,4-dimethyl-1-pentene | 23 | 11 |
| 1-methylcyclohexene | 20 | 4 |
| 3-ethyl-2-pentene | 27 | |
| 2,3,3-trimethyl-1-butene | 21 | |
| 1-octene | 97 | 55 |
| 2-octene | 105 | 55 |
| 2-ethyl-1-hexene | 47 | 22 |
| 3,5,5-trimethyl-1-hexene | 28 | 10 |
| 2,6-dimethyl-3-heptene | 34 | 13 |
| 1-decene | 100 | 91 |
| 1-phenyl-2-butene | 40 | 6 |
| 4-phenyl-1-butene | 92 | 40 |
| 1-dodecene | 100 | 92 |
| 1-octadecene | 102 | 100 |

TABLE VII.—PERCHLORATION OF ALCOHOLS

| Feed reactant | Perchlorate yield, percent on theory at— | | |
|---|---|---|---|
| | −10° C. | 25° C. | 35° C. |
| 1-propanol: | | | |
| 15 min. reaction | | 10 | |
| 1.5 hrs. reaction | | 42 | |
| 2-propanol | 6 | (¹) | |
| 2-methyl-2-propanol | ² 22 | | |
| 2-butanol 45 min. reaction | 88 | | |
| 2-pentanol 30 min. reaction | 92 | | |
| 1-pentanol | 0 | 10 | |
| 1-hexanol | 0 | 14 | |
| 2-hexanol | 102 | 5 | |
| 2-methyl-2-pentanol | 21 | | |
| 2,2-dimethyl-1-propanol | 0 | 7 | |
| 1-octanol | 0 | 15 | |
| 2-methyl-2-pentanol | 21 | | |
| 3-phenyl-1-propanol | | 0 | 0 |
| 1-dodecanol | | 0 | Trace |

¹ 65, ck. 75.
² Twice the usual amounts of HClO₄ and of hexane solvent were used in this run.

The results in Table VII indicate that among the alcohols unbranched non-primary alkanols give the best results. Primary alkanols of more than 10 carbon atoms and primary aralkanols are indicated as not being suitable feed materials for the present process. When non-primary aralkanols are used in the process, good results can be achieved provided that the position of the hydroxyl group is sufficiently removed from the aryl moiety.

The invention claimed is:

1. Process of preparing hydrocarbyl perchlorate which comprises contacting a fed reactant with perchloric acid in an emulsion comprising a sulfuric acid phase having a strength in the range of 80–101% by weight $H_2SO_4$ and an organic phase comprising an inert organic solvent selected from saturated hydrocarbon and halohydrocarbon solvents, said feed reactant being selected from
   (a) $C_3$–$C_{30}$ alkenes,
   (b) $C_4$–$C_{30}$ cycloalkenes,
   (c) $C_9$–$C_{30}$ aryl-substituted alkenes and cycloalkenes in which the olefinic bond is located at a position other than alpha to the aromatic nucleus,
   (d) $C_3$–$C_9$ saturated primary alcohols,
   (e) $C_3$–$C_{30}$ saturated non-primary alcohols, and
   (f) $C_{10}$–$C_{30}$ aryl-substituted non-primary alkanols and cycloalkanols in which the hydroxy group is located at a position other than alpha or beta to the aromatic nucleus,
said contacting being at a reaction temperature above the freezing point of the acid phase but below 75° C. and thereafter separating the acid phase from an organic phase containing hydrocarbyl perchlorate.

2. Process according to claim 1 wherein said strength is in the range of 90–100% by weight $H_2SO_4$.

3. Process according to claim 2 wherein said feed reactant is a hydrocarbon of the classes defined in (a), (b) and (c).

4. Process according to claim 3 wherein said temperature is below 35° C.

5. Process according to claim 4 wherein said feed reactant is an alkene or cycloalkene having not more than 20 carbon atoms per molecule.

6. Process according to claim 5 wherein the feed reactant is an unbranched alkene.

7. Process according to claim 5 wherein the feed reactant has less than 10 carbon atoms per molecule and said temperature is below 10° C.

8. Process according to claim 7 wherein the feed reactant is an unbranched alkene.

9. Process according to claim 4 wherein said feed reactant is an aralkene having not more than 20 carbon atoms per molecule.

10. Process according to claim 2 wherein said feed reactant is an alcohol of the classes defined in (d), (e) and (f).

11. Process according to claim 10 wherein said temperature is below 35° C.

12. Process according to claim 11 wherein said feed reactant is a non-primary alkanol or cycloalkanol having not more than 20 carbon atoms per molecule.

13. Process according to claim 12 wherein said feed reactant is an unbranched secondary alcohol.

14. Process according to claim 13 wherein said alcohol is of the $C_4$–$C_9$ range and said temperature is below 10° C.

15. Process according to claim 12 wherein said alcohol is isopropanol and said temperature is in the range of 10–35° C.

16. Process according to claim 1 wherein the feed reactant is an unbranched alkene or cycloalkene.

17. Process according to claim 16 wherein the feed reactant is of the $C_3$–$C_9$ range and the temperature is below 10° C.

18. Process according to claim 1 wherein the feed reactant is an unbranched secondary alkanol or cycloalkanol.

19. Process according to claim 18 wherein the feed reactant is of the $C_4$–$C_9$ range and said temperature is below 10° C.

20. Process according to claim 18 wherein the feed reactant is isopropanol and said temperature is above 10° C.

(References on following page)

References Cited

UNITED STATES PATENTS 3,524,871  8/1970  Matt _____ 260—454

OTHER REFERENCES

Showell et al., "The Reaction of cis-9-octadecene etc.;" (1967), J. Org. Chem. 34 (1969), pp. 1097–1103.

Burton et al., "Acylation & Allied Reactions Catalyzed by Strong Acids etc.;" (1955), J. Chem. Soc., 1955, pp. 3089–92 (1955).

Loudon et al., "o-hydroxylation of Phenols etc.;" (1950), J. Chem. Soc. 1950, pp. 55–58 (1950).

Schmitz-Dumont, "Catalytic Polymerization of Ethylene Dus., etc.;" (1938), CA 32, pp. 289–2901 (1938).

Lorenz et al., "Vinyl Homologs of Triphenylmethane Dyes" (1945), CA 40, p. 1483 (1946).

Gandini et al., "Interaction Between Perchloric Acid and Styrene etc.;" (1964), CA 61, p. 9582 (1964).

Smith et al., "Mixed Perchloric and Sulfuric Acids etc.;" (1935), CA 30, p. 700 (1936).

Young et al., "Use of perchloric Acid As An Oxidizing Agent," (1946), CA 43, p. 2436 (1949).

LEWIS GOTTS, Primary Examiner

G. HOLLRAH, Assistant Examiner

U.S. Cl. X.R.

149—46, 61, 106, 107, 109